US006801965B2

(12) United States Patent
Fellenstein et al.

(10) Patent No.: US 6,801,965 B2
(45) Date of Patent: Oct. 5, 2004

(54) AUDIO BUFFER STATION ALLOCATION

(75) Inventors: Craig Fellenstein, Brookfield, CT (US); Carl Phillip Gusler, Austin, TX (US); Rick Allen Hamilton, II, Charlottesville, VA (US); Timothy Moffett Waters, Richmond, VA (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 10/121,564

(22) Filed: Apr. 11, 2002

(65) Prior Publication Data

US 2003/0196009 A1 Oct. 16, 2003

(51) Int. Cl.[7] .............................................. G06F 3/00
(52) U.S. Cl. ........................ 710/52; 710/56; 711/170; 711/173
(58) Field of Search ...................... 710/52, 56; 711/170, 711/173

(56) References Cited

U.S. PATENT DOCUMENTS

| 5,796,785 | A | 8/1998 | Spiero ........................ 375/316 |
| 6,151,578 | A | 11/2000 | Bourcet et al. ............. 704/500 |
| 6,317,598 | B1 | 11/2001 | Wiesen et al. ............... 455/443 |
| 6,378,101 | B1 * | 4/2002 | Sinha et al. ................. 714/755 |
| 6,539,210 | B1 * | 3/2003 | Heredia et al. ........... 455/154.1 |
| 6,588,015 | B1 * | 7/2003 | Eyer et al. ..................... 725/89 |
| 6,609,039 | B1 * | 8/2003 | Schoen ......................... 700/94 |
| 6,658,014 | B1 * | 12/2003 | Tezuka ........................ 370/412 |

* cited by examiner

*Primary Examiner*—Jeffrey Gaffin
*Assistant Examiner*—Eron Sorrell
(74) *Attorney, Agent, or Firm*—David A. Mims, Jr.; Robert V. Wilder

(57) ABSTRACT

A method and system are provided in which broadcast signals are received and converted into data streams for processing. A user is enabled to select preferred broadcast stations for monitoring and signals from the selected stations are converted into digital data streams which are input to first-in first-out (FIFO) memory units to enable a local storage of a segment of predetermined duration of broadcast signals on different FIFO tracks in a user receiving device. The FIFO is dynamically allocated for the selected stations and as each FIFO memory for each selected station becomes full, old information or content is moved out of memory as new information or content is applied to the FIFO. The receiving device includes means for enabling a user to move forward or backward within the stored segment. Partitions or markers are provided to separate broadcast content items, such as sequentially played songs within the stored segment, to enable incremental movement to selected positions within the stored segment. Sections of stored segments which are selected for user processing are copied to separate memory locations for access to avoid interference with the continuing FIFO storage of received broadcast signals.

20 Claims, 5 Drawing Sheets

AUDIO BUFFER STATION ALLOCATION

RELATED APPLICATIONS

Subject matter disclosed and not claimed herein is disclosed and claimed in related co-pending applications, Ser. Nos. 10/121,573 and 10/122,008, which are assigned to the assignee of the present application.

FIELD OF THE INVENTION

The present invention relates generally to information processing systems and more particularly to a system and methodology for enabling digital audio signal processing.

BACKGROUND OF THE INVENTION

In today's rapidly converging environment of communications and computing, manufacturers of devices in each field, i.e. communications equipment and computational devices, are finding immense value in reaching across the boundaries which once separated their respective arts to enhance the native functionality of equipment marketed to each field. Examples are numerous as mobile computing devices, e.g. personal digital assistants, adopt wireless technologies and as communications devices enhance their own functionality through the incorporation of increasingly powerful processors and embedded software.

In the rapidly changing world of telecommunications and electronics in general, the concepts of radio that exist today are not much different from those in existence in the early part of the twentieth century. Despite the advent of physical media which enable a user to carry the music to which the user wishes to listen, the concept of radio still exists in a format offering users very few user options. Although a user may choose a station or several stations which may be preferred by the user, there are no current options which enable users to listen to news or music, for example, at the user's convenience rather than on the timetables provided by the local broadcasters.

Thus, there is a need for an improved digital audio processing system which provides a greater degree of control by users of radio and other broadcast signal content.

SUMMARY OF THE INVENTION

A method and system are provided in which broadcast signals are received and converted into data streams for processing. A user is enabled to select preferred broadcast stations for monitoring and signals from the selected stations are converted into digital data streams which are input to first-in first-out (FIFO) memory units to enable a local storage of a segment of predetermined duration of broadcast signals in a user receiving device. The FIFO capacity is divided by number of selected stations, or a default number of the strongest stations received, and the FIFI is reconfigured in order to maximize available stored segment duration for each selected station. As each FIFO memory for each selected station becomes full, old information or content is moved out of memory as new information or content is applied to the FIFO. The receiving device includes means for enabling a user to move forward or backward within the stored segment. Partitions or markers which separate broadcast content items, such as sequentially played songs within the stored segment, are provided to enable incremental movement to selected positions within the stored segment.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
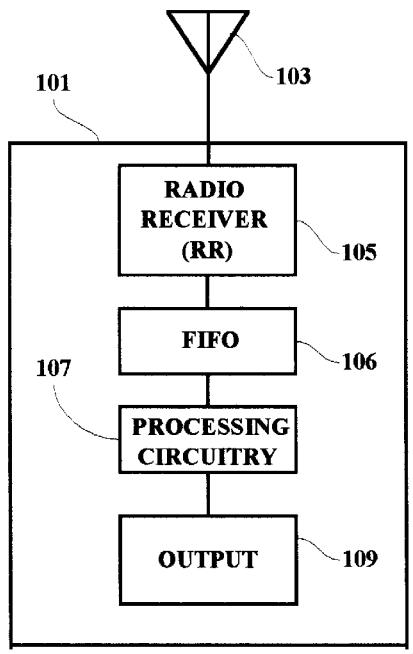
FIG. 1 is a block diagram of a receiving device implemented in accordance with the present invention.

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

With reference to FIG. 1, the various methods discussed herein may be implemented within a receiving device 101 which illustrates only one of many possible exemplary embodiments of the present invention. The receiving device 101 is arranged to receive broadcast signals through an antenna 103. A radio receiver 105 receives signals from the antenna 103 and converts those signals into a plurality of digital data streams of information. Received signals may include, for example, amplitude modulated (AM), frequency modulated (FM) and/or citizen's band (CB) signals, inter alia. Analog signals are converted into digital streams through analog-to-digital converters (not shown) within the radio receiver block 105. As hereinafter discussed in greater detail, a digital data stream is generated for each station that has been tuned-in or selected by a user of the receiving device 101. If no stations have been pre-selected by a user, the receiving device 101 provides data streams for each of a predetermined number of the strongest stations received by the receiver 105. In the present example, where no stations have been pre-selected by a user, the radio receiver 105 will digitize and provide data streams for the four strongest stations being received. It is understood that the exact number of default stations may be any number depending upon the application and the number of stations being received in the geographical area. The station digitized data streams are applied to a first-in first-out (FIFO) memory arrangement 106 which is coupled through processing circuitry 107 to an output 109 which may comprise, for example, a speaker system and a visual display such as a liquid crystal display (LCD). It should be noted also that various compression techniques may also be implemented in connection with the circuitry shown. For example, the system may include digital data compression of the audio signals for improved system efficiency.

Figure 2:
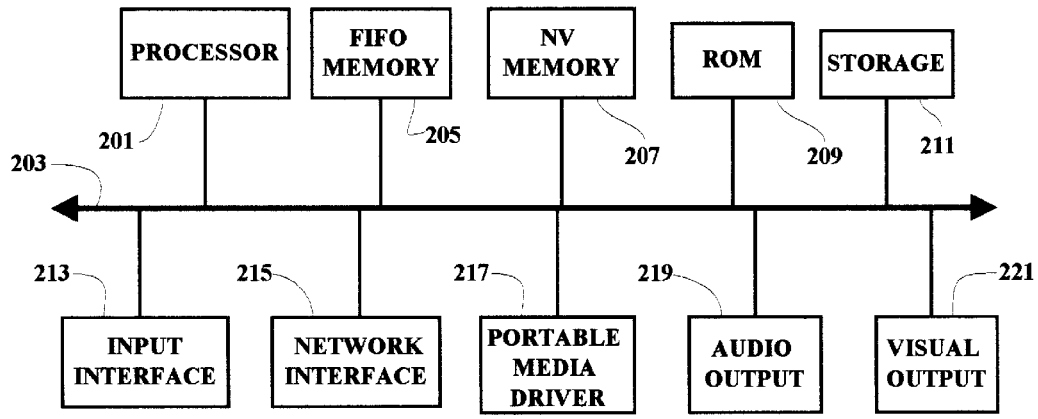
FIG. 2 is a schematic block diagram of several of the components of the receiving device.

As shown in FIG. 2, the exemplary receiving device 101 includes, inter alia, a processor 201 which is coupled to a main bus 203. Other components that are connected to the main bus 203 include a FIFO memory 205 and a separate non-volatile (NV) memory 207. Both the FIFO 205 and the NV memory 207 may be comprised of Flash memory components that are capable of storing information and being written-over with new information, and which will not lose memory content in a power-down event. The exemplary receiving device also includes a read-only memory (ROM) device 209, a storage device 211, an input interface 213 a network interface 215, a portable media driver 217, an audio output device 219 and a visual output device 221, all connected to the common bus 203. All of the components shown in FIG. 2 are not necessary in order to practice the present invention and are shown only to illustrate an exemplary embodiment in which the present invention may be implemented. It is noted that the input interface 213 is provided in order to enable a user to input user selections through the use of a keypad (not shown) for example, in response to menu selections and/or user prompts which may appear on the visual output device 221.

In an exemplary operation, after a user turns on the receiving device 101, the user may hit a "Scan" button (not shown) which will cause the receiver to scan through the stations being received at the current time and play several seconds of content from each station before proceeding to the next received station. When the user wishes to designate one of the stations as a selected station, the user will hit a select button which will lock-in the currently playing station as one of the user selected stations. In this manner, a user may designate a variable number of selected stations for monitoring. As a default, if the user does not select any stations, the receiving device 101 will lock into a predetermined number of the strongest stations being received and those stations will be designated as the selected stations for monitoring purposes. After designating the selected or favorite stations, the user may choose to listen to one of the selected stations. Although the user is listening to only one of the stations, all of the selected stations are being monitored and digital data streams are being generated for each station representative of the content being broadcast from each station. Each of the digital data streams is applied to a different FIFO string such that broadcast content for a predetermined period of time is being stored at the receiving device for all selected broadcast stations. As is hereinafter explained in more detail, at any given time, a user may switch channels or stations and listen to another station either in real time or review content that was broadcast at an earlier time and stored in FIFO. Additionally, a user is enabled to select to download saved content to a portable medium loaded in the portable media driver 217 for subsequent transfer and/or play from another media player device.

Figure 3:
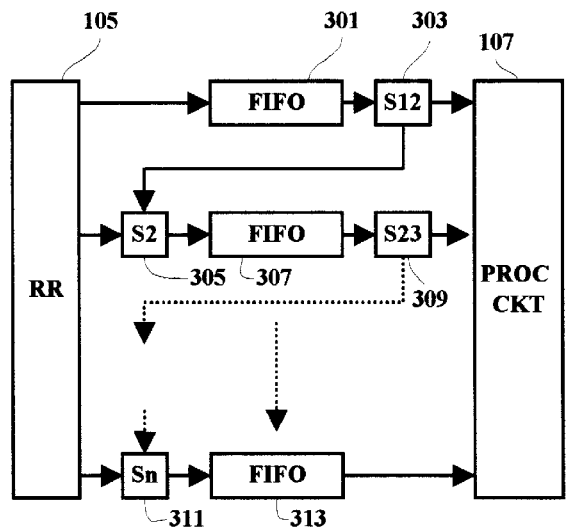
FIG. 3 is a schematic diagram showing the FIFO memory arrangement of the receiving device in more detail.
Figure 4:
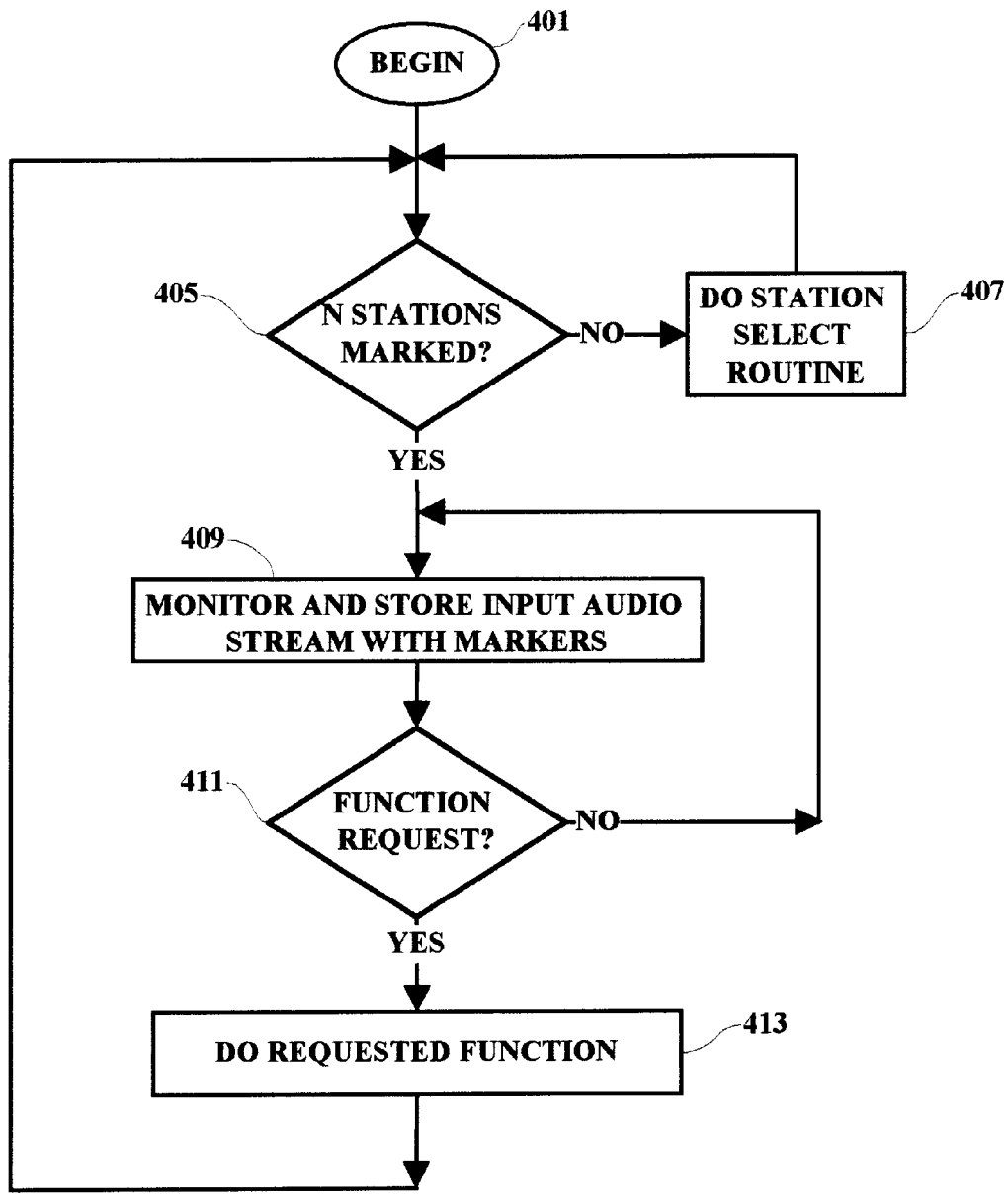
FIG. 4 is a flow chart illustrating a high level sequence of operations in accordance with the present invention.
Figure 7:
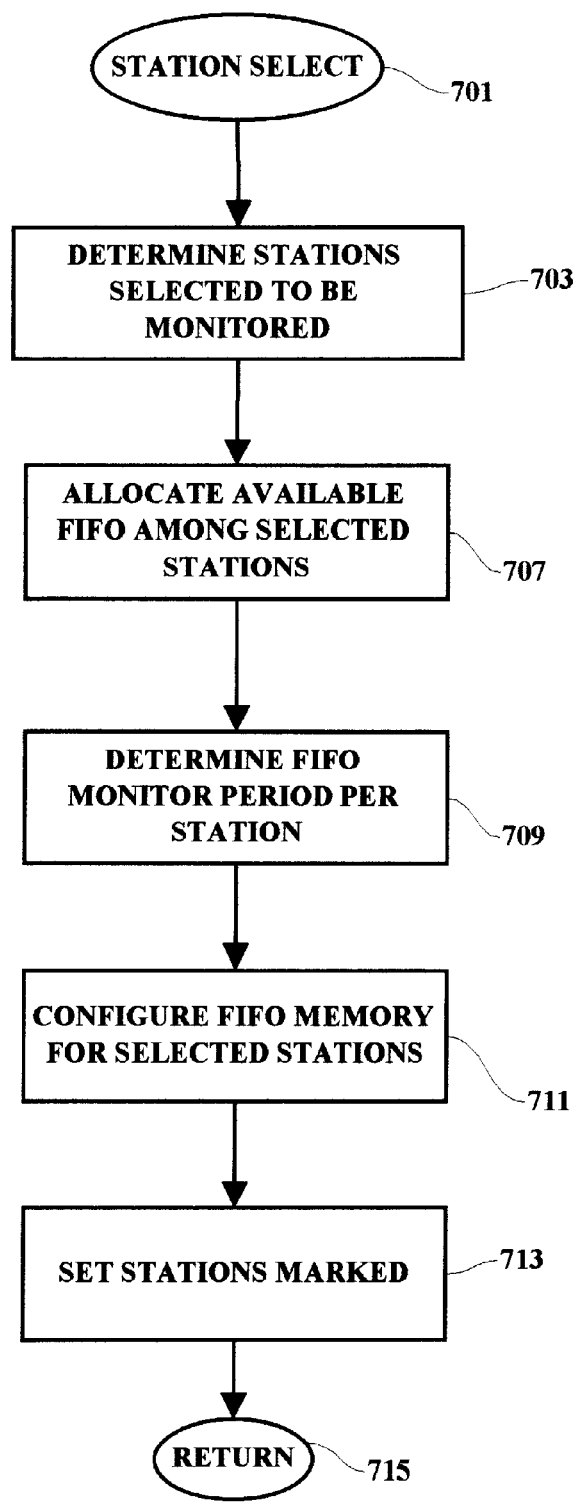
FIG. 7 is a flow chart showing the station select routine of FIG. 4 in greater detail.

An exemplary embodiment of the FIFO arrangement 106 is shown in detail in FIG. 3. As shown, separate digitized streams of data are provided from the radio receiver (RR) 105 to a different FIFO channel for each selected station. For example, a first channel includes a first FIFO 301, a second channel includes a second FIFO 307 and so on, to provide "n" FIFO channels for capturing digitized data streams from receiver 105. Each channel includes switching devices (e.g. S12, S2, S23) to enable reconfiguration of the FIFO units to maximize "capture" time for the data stream segments of only the selected stations which are captured in the FIFO devices. That process is illustrated in the "Station Select" process shown in FIG. 7. As shown, the process begins 701 when a user determines or selects the stations to be monitored 703. As noted earlier, this is accomplished either through direct user input or through a default process of selecting the strongest stations being received. Next the available FIFO capacity is allocated 707 or divided equally among the selected stations to maximize the recording capacity or duration for each selected station. Thus the predetermined FIFO memory duration is determined from the number of selected stations. Once that is known, the monitor period per station is determined 709 and the FIFO memory units are configured accordingly. For example, if there are eight FIFO units (i.e. "n"=8 in FIG. 3), and four stations have been selected by the user, then each station will have two FIFO units available to store its digitized data stream. The FIFO memory units are then arranged or configured 711 by manipulating the status of the switching devices S1 through Sn such that each data stream passes through two FIFO units before being applied to the processing circuit 107. After the configuring process 711, a flag may be marked 713 to indicate that the FIFO is ready to receive data streams and the station select routine returns 715 to the main processing flow (FIG. 4). In the example where there are four selected stations and eight FIFO units, such that each data stream flows through two FIFO units, the switch S12 303 of FIG. 3 will be open to the processing circuit 107 but closed to switch S2, and switch S2 will be open from the radio receiver 105 but closed to receive data from switch S12 303 and apply that data to the second FIFO unit 307. Switch S23 309 will be closed to the processing circuit 107 to pass data from the first station selected through FIFO units 301 and 307 to the processing circuit 107 for further processing. The remaining switches and FIFO units in the FIFO array to FIFO 313 are similarly configured to accommodate the example where there are four selected stations and eight FIFO units. Where an odd number of stations are selected and the number does not divide evenly into the number of FIFO units, then the system will default to one FIFO unit per station as needed to temporarily store data segments from each selected station.

In another example, a software implementation of the FIFO buffers shown in FIG. 3 may be used. In that implementation, the hardware switches S1–Sn would not be required. A large random access memory (RAM) array may be used which would be arbitrarily and equally divided into the desired number of buffers. Software pointers would be used to write to and read from the appropriate RAM locations in order to serve or feed the various FIFO queues.

As shown in FIG. 4, an exemplary operational sequence begins 401 when power is applied to the receiver device 101. Power-on in this example is when power is applied to the processing unit and FIFO and is considered separate from a turn-on of the amplification process for user listening. After power-on, a check is made to determine if any stations have been pre-selected in a current or previous user operation. If no stations have been selected by a user, then a station select routine is run 407 to enable user input of preferred stations or to determine default stations for monitoring. Next, the input digital audio data streams from each of the selected stations is stored 409 in the FIFO memory units 106. These data streams may be captured by the FIFO units even if a user is not listening to any of the stations, i.e. even if the received signals are not being amplified for playing to a user, the selected stations can be monitored and content saved in FIFO such that when a user does turn-on the device for listening, the FIFO will already have saved a predetermined duration of broadcast content prior to the user turn-on. Thus, if a user misses the beginning of a program, the user will still be able to access the content from the beginning by using the controls provided herein. The data streams include program markers which separate sequential songs or program segments and those markers can be located and accessed during subsequent processing to enable a user to "move around" a data stream, i.e. move forward and reverse within a stored data stream, during a play or play-back mode. The receiver device 101 will continue to monitor and store input audio data streams for the selected stations so long as power is applied and there are no further selections made by the user. When a user inputs a function request 411, such as a request to change stations or playback a segment, the process executes the selected function 413 and returns to the top of the process in FIG. 4.

Figure 5:
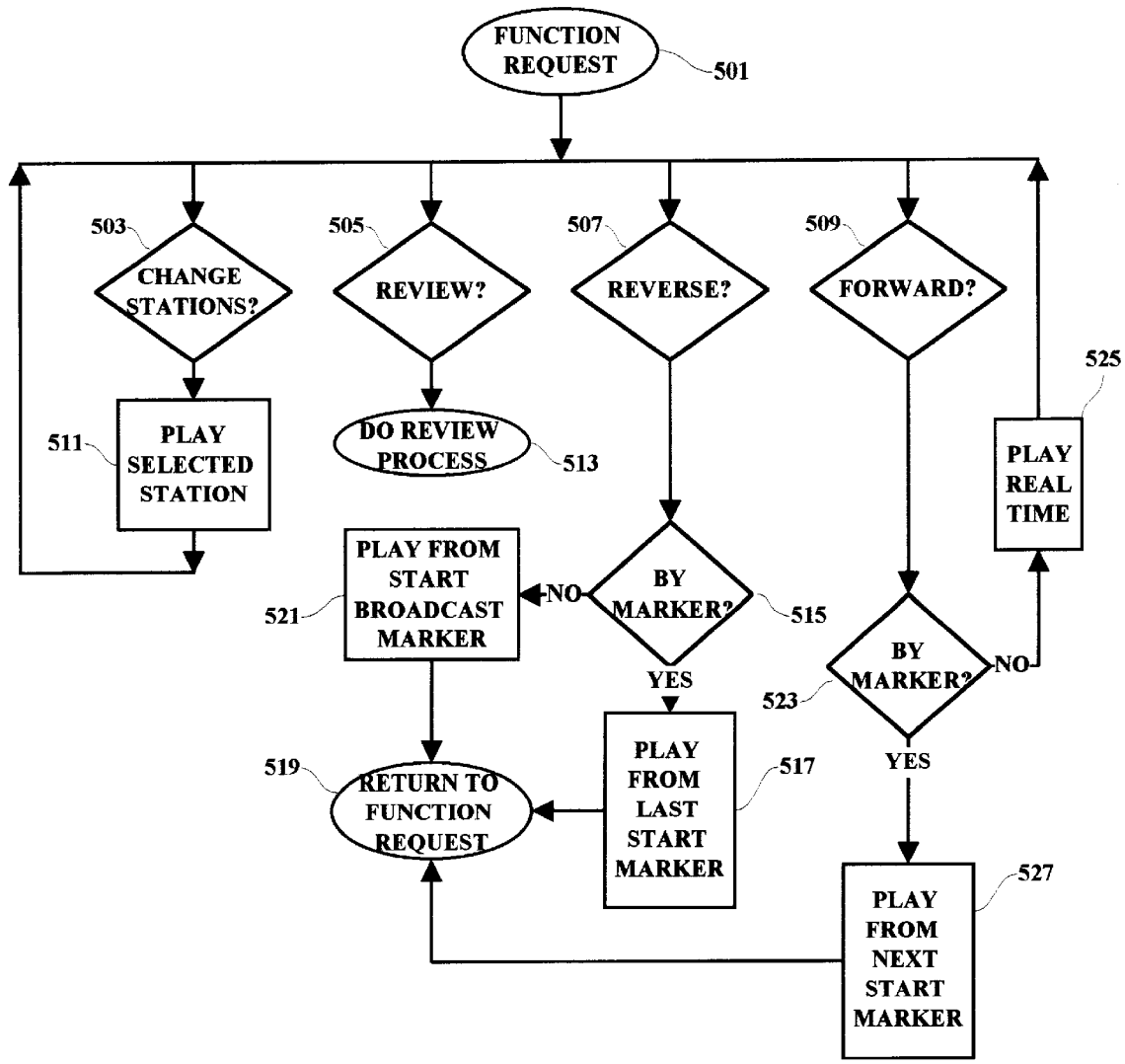
FIG. 5 is a flow chart showing the function request routine of FIG. 4 in greater detail.

As shown in FIG. 5, the function request process 501 enables a user to select from a number of different functions including change stations 503, review a previously played data stream segment 505, reverse to a previous point in the segment being played 507 or move forward 509 in a FIFO stored segment of a data stream. Other functions may also be implemented in connection with the use and processing of the FIFO stored data stream segments. When the user changes stations 503, the user-selected station is then amplified and played 511 in real time. If a user wishes to review a previously played segment 505, a review process (FIG. 6) is executed 513. If a user chooses to reverse or move backwardly in the data stream 507, a check is made to determine if the user wishes to move back in marker increments 515 i.e. in a segment-by-segment or song-by song mode. This may be accomplished through a user prompt and user input with a default to marker or beginning of broadcast starting point. If the user selects to reverse by marker increments 515 then the last marker in the data stream is accessed and the data stream is played from that point 517 and the process returns to the top of the function request process 501. If the user selects to reverse to the beginning of the broadcast program 515 then the start-of-program marker is located and the data stream is played from that point 521. If the program has been playing for a time greater than the duration of the FIFO storage capacity for a selected station and the content is not available from the beginning of the broadcast, then the data stream is played back from the earliest available point in the FIFO memory, and the program returns 519 to the top of the function request process 501. If a user selects to move forward 509 in the FIFO data stream, then a check is made to determine if the user wishes to move forward by marker increments 523 or all the way forward to real time playing 525. If marker-by-marker mode is chosen, then the receiving device moves forward in the FIFO stream to the next marker stored, begins to play at that point 527 and returns to function request 519. If the marker mode is not selected 523, then the receiving device begins to play station content in a real time mode 525 as it is being received.

Figure 6:
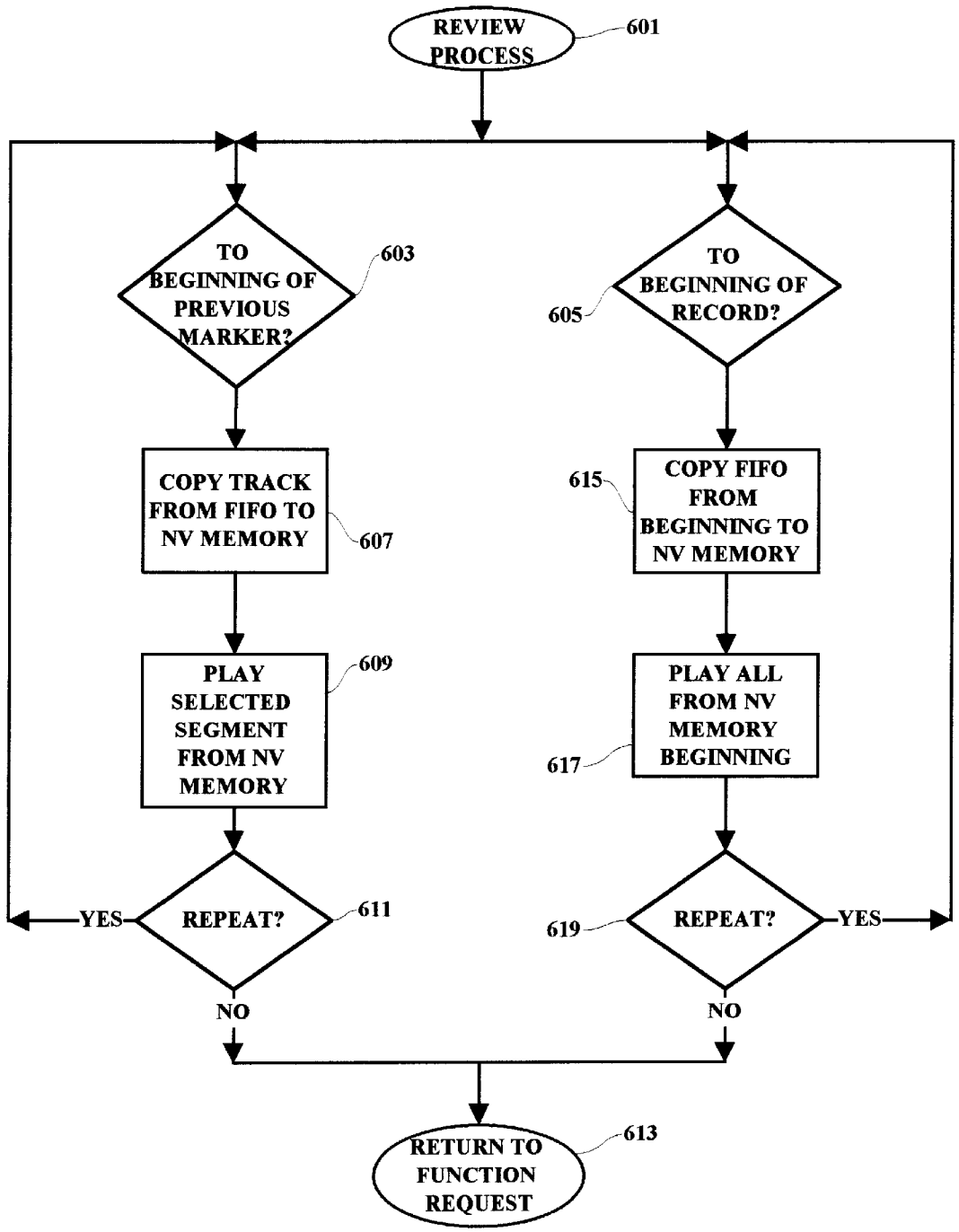
FIG. 6 is a flow chart showing the review process routine of FIG. 5 in greater detail.

As shown in FIG. 6, the review process 601 enables a user to select to review or playback a datastream either from the beginning of a marker 603 or from the beginning of the FIFO record 605. The beginning of the FIFO record in this context means the earliest data available in the FIFO unit. If the user selects to review the datastream from the next previous marker 603, then the FIFO content segment beginning at the previous marker in FIFO is copied from FIFO to other separate memory space such as a separate non-volatile memory 607, and the copied datastream is played in review 609 from the new location in memory to which the datastream was copied. The selected datastream may be repeated 611 as often as desired before returning to the function request process 613. In a similar manner, if the user selects to review the FIFO datastream from the beginning of the FIFO datastream or record 605, then the entire content of the FIFO for the selected station is copied to a separate memory or memory location 615 and the copied datastream is played 617. The entire record may be repeated as often as desired 619 before returning 613 to the top of the function request process. In the review mode, the appropriate content in FIFO is copied to a separate memory or a separate location in memory in order to avoid interfering with the continuing recording or capturing of real time content received from the selected stations while the user is replaying the selected portions of previously broadcast content.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for allocating memory for storing a selected number of digital data streams in a corresponding number of memory segments, said method comprising:

receiving a plurality of digital data streams;

determining said selected number of said digital data streams from said plurality of digital data streams;

processing only said selected number of said digital data streams for storage in memory;

determining a number of memory units available in said memory for storing said selected number of said digital data streams; and configuring said memory units in an arrangement to maximize a number of memory units in each of said memory segments used to store each of said selected number of digital data streams thereby enabling a user to change a duration of digital data streams being stored for each of said selected number of digital data streams by changing said selected number of said digital data streams to be processed for storage.

2. The method as set forth in claim 1 wherein said memory units comprise a plurality of first-in first-out (FIFO) memory devices.

3. The method as set forth in claim 1 wherein each of said digital data streams corresponds to a broadcast station providing respective ones of said plurality of digital data streams, said configuring being accomplished dynamically after a number of said broadcast stations corresponding to said selected number has been selected for storage.

4. The method as set forth in claim 3 and further including enabling a user to choose said selected digital data streams for playing on an audio output device.

5. The method as set forth in claim 3 and further including enabling an automatic determination of said selected broadcast stations based upon strength of signals received.

6. The method as set forth in claim 5 wherein said automatic determination is made by determining a number of strongest signals received from said broadcast stations, said number of said strongest signals received corresponding to said selected number.

7. The method as set forth in claim 6 and further including enabling a user to input said number of said strongest signals received.

8. A storage medium, said storage medium being selectively coupled to processing circuitry, said storage medium containing indicia readable by said processing circuitry for providing program signals to control storing a selected number of digital data streams in a corresponding number of memory segments, said program signals being effective for enabling:

receiving a plurality of digital data streams;

determining a said selected number of said digital data streams from said plurality of digital data streams;

processing only said selected number of said digital data streams for storage in memory;

determining a number of memory units available in said memory for storing said selected number of said digital data streams; and configuring said memory units in an arrangement to maximize a number of memory units in each of said memory segments used to store each of said selected number of digital data streams thereby enabling a user to change a duration of digital data streams being stored for each of said selected number of digital data streams by changing said selected number of said digital data streams to be processed for storage.

9. The medium as set forth in claim 8 wherein said memory units comprise a plurality of first-in first-out (FIFO) memory devices.

10. The medium as set forth in claim 8 wherein each of said digital data streams corresponds to a broadcast station providing respective ones of said plurality of digital data streams, said configuring being accomplished dynamically after a number of said broadcast stations corresponding to said selected number has been selected for storage.

11. The medium as set forth in claim 10 wherein said program signals are further effective for enabling a user to choose said selected digital data streams for playing on an audio output device.

12. The medium as set forth in claim 10 wherein said program signals are further effective for enabling an automatic determination of said selected broadcast stations based upon strength of signals received.

13. The medium as set forth in claim 12 wherein said automatic determination is made by determining a number of strongest signals received from said broadcast stations, said number of said strongest signals received corresponding to said selected number.

14. The medium as set forth in claim 13 wherein said program signals are further effective for enabling a user to input said number of said strongest signals received.

15. A system for allocating memory for storing a selected number of digital data streams in a corresponding number of memory segments, said system comprising:

a system bus;

a CPU device connected to said system bus;

a memory including a plurality of memory units connected to said system bus;

an input device connected to said system bus, said input device being arranged to enable user input to said system;

a user display device connected to said system bus;

an audio output device; and means arranged for receiving a plurality of digital data streams and determining a said selected number of said digital data streams from said plurality of digital data streams, said system being operable for processing only said selected number of said digital data streams for storage in memory, said system being further operable for determining a number of memory units available in said memory for storing said selected number of said digital data streams and configuring said memory units in an arrangement to maximize a number of memory units in each of said memory segments used to store each of said selected number of digital data streams thereby enabling a user to change a duration of digital data streams being stored for each of said selected number of digital data streams by changing said selected number of said digital data streams to be processed for storage.

16. The system as set forth in claim 15 wherein said memory units comprise a plurality of first-in first-out (FIFO) memory devices.

17. The system as set forth in claim 15 wherein each of said digital data streams corresponds to a broadcast station providing respective ones of said plurality of digital data streams, said configuring being accomplished dynamically after a number of said broadcast stations corresponding to said selected number has been selected for storage.

18. The system as set forth in claim 17 and further including enabling a user to input said selection of said digital data streams for playing on an audio output device.

19. The system as set forth in claim 17 and further including enabling an automatic determination of said selected broadcast stations based upon strength of signals received.

20. The system as set forth in claim 19 wherein said automatic determination is made by determining a number of strongest signals received from said broadcast stations, said number of said strongest signals received corresponding to said selected number.

* * * * *